(12) United States Patent
Voit et al.

(10) Patent No.: US 6,845,856 B2
(45) Date of Patent: Jan. 25, 2005

(54) RELEASE MECHANISM WITH A DEVICE FOR COMPENSATING FOR INACCURACIES IN A FRICTION CLUTCH OF A MOTOR VEHICLE

(75) Inventors: Herbert Voit, Schweinfurt (DE); Matthias Brunner, Schwebheim (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/449,954

(22) Filed: May 30, 2003

(65) Prior Publication Data

US 2003/0230462 A1 Dec. 18, 2003

(30) Foreign Application Priority Data

May 31, 2002 (EP) ............................................. 02012023

(51) Int. Cl.[7] ............................................. F16D 23/14
(52) U.S. Cl. ..................................... 192/98; 192/89.24
(58) Field of Search ............................. 192/98, 110 B, 192/89.24, 70.13; 384/495, 612

(56) References Cited

U.S. PATENT DOCUMENTS

| 3,741,361 | A | | 6/1973 | Brandenstein |
| 3,948,371 | A | | 4/1976 | Lönne |
| 4,739,867 | A | * | 4/1988 | Harrington ................... 192/98 |
| 5,082,098 | A | * | 1/1992 | Gay et al. ................. 192/89.24 |
| 5,836,432 | A | | 11/1998 | Husse et al. |
| 5,842,550 | A | | 12/1998 | Asada et al. |
| 2003/0070898 | A1 | * | 4/2003 | Wolbers et al. ................ 192/98 |

FOREIGN PATENT DOCUMENTS

| DE | 199 12 431 A1 | 9/1999 |
| FR | 2 601 094 | 1/1988 |

* cited by examiner

Primary Examiner—Richard M. Lorence
(74) Attorney, Agent, or Firm—Cohen, Pontani, Lieberman & Pavane

(57) ABSTRACT

A release mechanism for actuating a friction clutch is concentric to a center axis of a guide sleeve mounted in turn on a transmission shaft. The release mechanism includes a clutch release bearing and a device for compensating for the tilt of the center axis of the friction clutch with respect to the center axis of the guide sleeve and/or for the wobbling eccentricity of the release spring. The clutch release bearing includes an inner ring, an outer ring, and an adjusting sleeve. One of the inner ring or outer ring communicates with a release spring of the friction clutch. The device for compensating for the tilt of the center axis of the friction clutch with respect to the center axis of the guide sleeve and/or for the wobbling eccentricity of the release spring includes a release ring and a load ring. The release ring is in contact with a finger of the release spring of the friction clutch and includes a spherical surface having a center on the axis of the transmission shaft. A load ring cooperates with the spherical surface of the release ring and communicates with the adjusting sleeve for placing the one of the inner ring and outer ring in communication with the release spring. Preferably the release ring is curved and the load ring is a circular cross-sectioned wire to reduce wear.

12 Claims, 3 Drawing Sheets

RELEASE MECHANISM WITH A DEVICE FOR COMPENSATING FOR INACCURACIES IN A FRICTION CLUTCH OF A MOTOR VEHICLE

FIELD OF THE INVENTION

The present invention relates to a clutch release mechanism for actuating a friction clutch between an internal combustion engine and a transmission of a motor vehicle.

BACKGROUND OF THE INVENTION

A clutch release mechanism for a push-type friction clutch used in motor vehicles is disclosed in DE 199 12 431 A1. The mechanism includes a release bearing, which is mounted on a sliding sleeve, and a disk spring, which is part of the friction clutch and is in working connection with the release bearing. Particularly, the disclosed mechanism includes two areas with complementary surfaces in the form of segments of a sphere that are provided between the disk spring and the release bearing. The two areas with the spherical segments are provided directly or indirectly on the disk spring; and the areas forming the spherical segments can be shifted radially toward the release bearing.

The areas of the spherical segments are slideable with respect to each other. The slideable surfaces, i.e. areas, are formed from a finger of the disk spring, i.e. release spring, and a flange-like contact surface of a compensating ring of the release bearing.

The complementary spherical segments are subjected to continuous wear as they swivel against each other at a high frequency due to inherent vehicle vibrations. When the elements with the complementary spherical segments must compensate for a tilt of the center axis of the friction clutch with respect to the center axis of the guide sleeve and/or for a wobbling eccentricity or gyration of the release spring, they are in constant contact with each other as they move. Disadvantageously, as the friction clutch becomes worn, abraded material also accumulates, especially in the area of the release mechanism. This material cannot be kept away from the surfaces which slide across each other. Furthermore, it is very expensive to produce two elements with perfectly matching spherical surfaces.

SUMMARY OF THE INVENTION

Thus, it is an object of the present invention to overcome the aforementioned shortcomings. Therefore, a clutch release mechanism for actuating the release spring of a friction clutch of a motor vehicle includes a device for compensating for a tilt in the position of the center axis of the friction clutch with respect to the center axis of the guide sleeve and/or for a wobbling eccentricity of the release spring.

The device includes a release ring, which acts on the release spring, where a spherical surface with a radius originating from the center axis of the transmission shaft is provided on the release ring, and a load ring, which is made out of wire with a round cross-section, which is mounted at least indirectly on the adjusting sleeve and is in working connection with the spherical surface of the release ring.

In one embodiment, the load ring is a piece of wire with a round cross-section. Thus, it is possible to achieve a perceptible improvement in efficiency while reducing costs at the same time. The load ring has a very narrow contact zone with the concave spherical surface of the release ring, wherein the zone is a curved line. Wear is reduced, since, unlike a flanged ring, that is subject to friction only on one plane, the friction to which a wire ring is subject, when it swivels with respect to the ring-shaped spherical surface, consists, especially at high frequencies, not only of sliding friction but also of a certain amount of rolling friction occurring at least in the range of the micro-movements of the wire ring. In one embodiment, advantageously the spherical surface of the release ring is disposed with lifetime lubrication to improve wearablity.

In one embodiment, especially for pull-type release mechanisms, the wire ring is mounted on the adjusting sleeve, which is usually a modified inner ring of the release bearing, by inserting it into a groove provided there, after the release ring has been pushed onto the adjusting sleeve. Thus, the release ring rests under pressure against the release spring of the friction clutch by way of a ring-shaped contact surface. This pressure contact is maintained by a retaining spring. When the release spring wobbles, the release ring compensates for this movement by sliding on the wire ring without transmitting this movement to the adjusting sleeve. To prevent contact between the release ring and the adjusting sleeve, a recess must be provided to allow room for the smallest diameter of the release ring. The exact size of the recess depends on the extent of the deflections and on the diameter of the wire ring.

In one embodiment, advantageously a clutch release mechanism facilitates assembly by means of a snap-in connection between the wire ring and the adjusting sleeve. Therein, the sleeve has a bevel on the end surface for the purpose. The groove for the wire ring is wider to allow for the previously described mounting of the release ring. This has no effect on the function of the release mechanism. In addition, a recess is also provided near the groove, as described above, to prevent contact between the release ring and the adjusting sleeve.

As previously explained, the wire ring is open ended and can be easily snapped into its groove during assembly. In one embodiment, the two ends of the wire ring are secured by a closure. This closure may exert tensile force on the wire ring. The tensile force provides additional help in preventing the wire ring from being disengaged from its groove at high revolutions of the drive train.

In one embodiment, a wire with a round cross-section is connected to the release ring, and the spherical surface is connected to the adjusting sleeve. The groove for the wire ring is located in the inner diameter of the release ring, whereas the adjusting sleeve has a ring-shaped groove, which is large enough to hold a preferably convex spherical surface. When the release ring is being mounted on the adjusting sleeve, the wire ring is placed in the ring-shaped groove, and then the release ring, which has a bevel, is pushed on. The wire ring is held in place by a radial flank of the ring-shaped groove and slides along the bevel of the release ring in a radially inward direction until it can snap into its final position in the groove.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
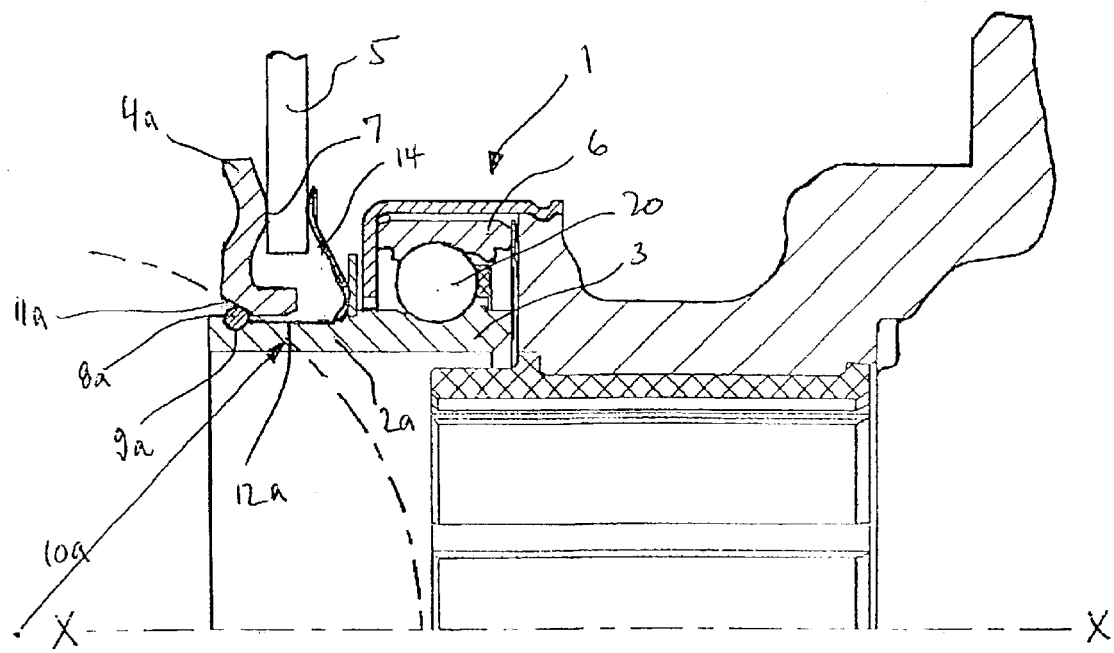
FIG. 1 is a cross-sectional view of clutch release mechanism in accordance with the present invention showing a load ring and a release bearing in a single position.

FIG. 1 is a cross-sectional view of a clutch release mechanism of the present invention for actuating a friction clutch by way of a release spring 5 located on a main axis X—X corresponding to the axis of rotation of the friction clutch. The release mechanism has a release bearing 1, which is a ball bearing 20 with an inner ring 3 and an outer ring 6, and where the inner ring 3 forms an integral part of an adjusting sleeve 2a, which carries, by way of groove 9a, a load ring 8a. Load ring 8a is a wire ring having a round cross-section. Load ring 8a contacts concave spherical surface 11a of release ring 4a to form a ball joint having a center, which is the origin of radius 10a, and about which the release ring 4a can pivot. The release ring 4a presses against the release spring 5 by way of a contact point 7 to reduce friction. Contact is maintained by a retaining spring 14 pushing on release spring 5.

Figure 2:
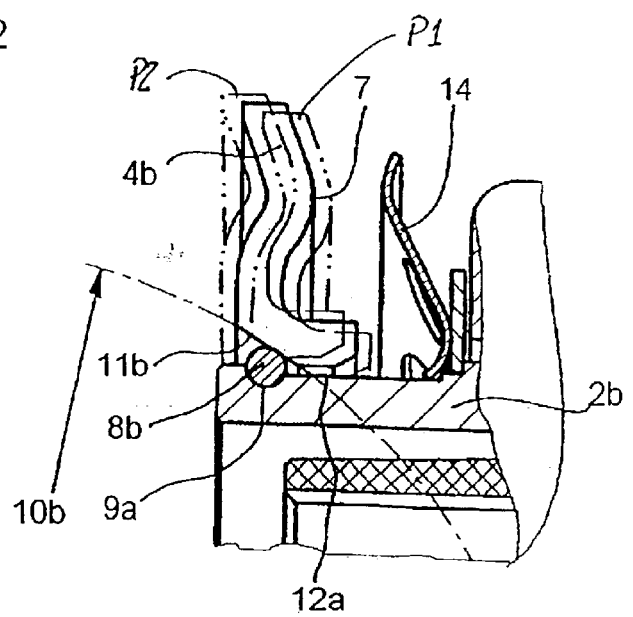
FIG. 2 is a partial cross-sectional view of the clutch release mechanism of FIG. 1 with the release ring shown in different positions and cooperating with a wire ring seated in a groove in the adjusting sleeve.

The release ring 4a with its concave spherical surface 11a is shown in only one position (see FIG. 2 for varying positions of release ring 4). Adjusting sleeve 2a is not only provided with a groove 9a for retaining load ring 8a but also with recess 12a allowing sufficient space by changing positions of release ring 4a. It is understood that inner ring 3 of ball bearing 20 can form a separate part from adjusting sleeve 2a as is shown in the art.

FIG. 2 is a partial cross-sectional view of the clutch release mechanism of FIG. 1. The adjusting sleeve 2b has a groove 9a, in which a wire load ring 8b with a round cross-section is securely seated. The wire load ring 8 cooperates with a concave spherical surface 11b of a release ring 4b. The spherical surface 11b has a radius 10b. Consequently, the cross-section radius of the wire ring 8b is many times smaller than the radius 10b of the spherical surface 11b.

The release ring 4b is shown in its normal position and in two different swiveled positions, P1 and P2, to show that a recess 12a must be provided in an area next to the groove 9a to give the release ring 4b sufficient room to swivel. Again, the S-shaped configuration of the release bearing ring allows for easy swiveling and compensation for any gyrating movement of the guide sleeve and/or the release spring.

In one embodiment, the relatively narrow spherical surface 11b is approximated by an appropriate conical surface on the release ring 4b without leading to any essential loss of functionality of the device.

In the cross-section of FIG. 2, the conical surface is tangent to the spherical surface 11b. Since the swiveling range of the release spring 5 with the release ring 4b mounted thereon is relatively small in comparison with the spherical radius 10b, the spherical surface 11b can be approximated relatively well over the short distance in question by a segment of a cone. Thus, the extent to which wobbling movements can be compensated will also be similar to that achieved by a spherical surface. This embodiment provides considerable manufacturing advantages, because conical surfaces are much easier to fabricate than spherical ones.

In FIGS. 1 and 2, the mutual contact surface between the release ring 4a, 4b and the wire load ring 8a, 8b is located axially on the distal side of the release spring 5, i.e. the side facing away from the release mechanism 1 along the main axis of the friction clutch.

Figure 3:
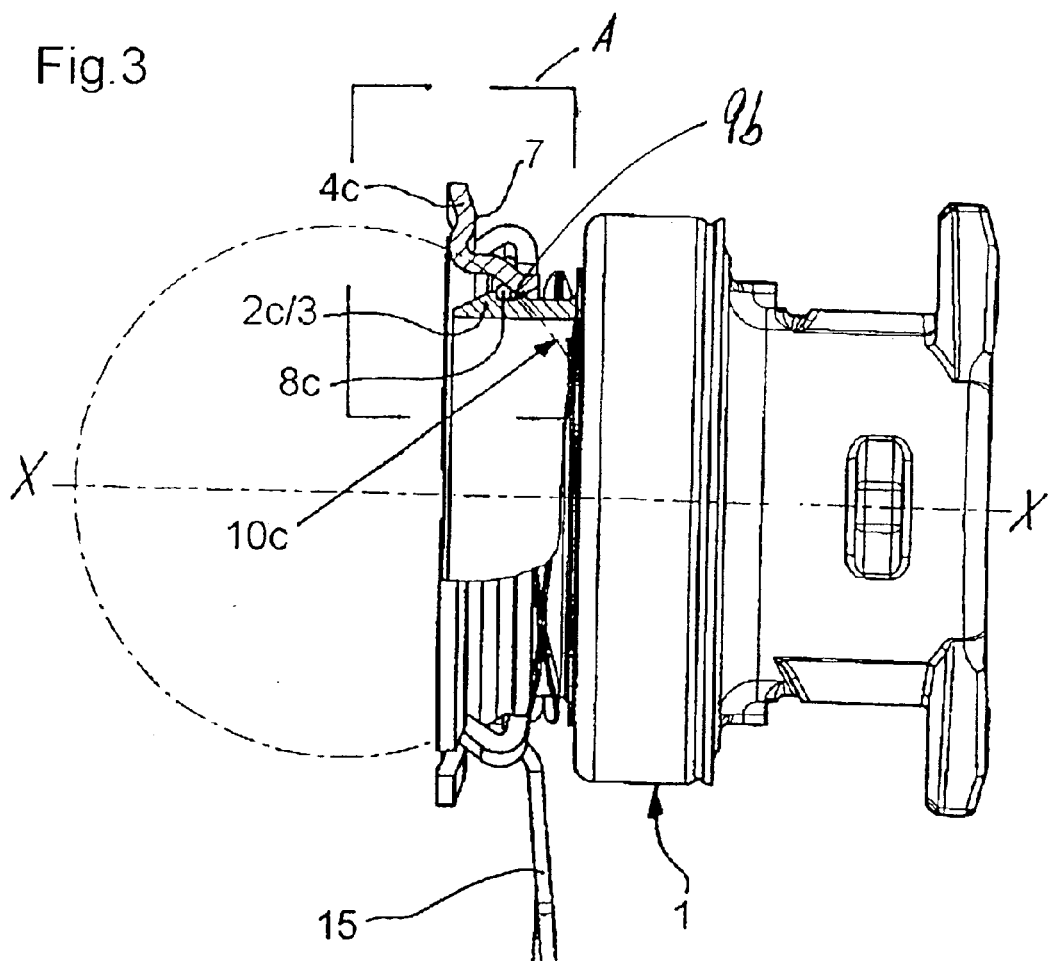
FIG. 3 is a partial cross-sectional view of a variant of a clutch release mechanism with a snap-in connection between the release ring and an assembly consisting of the adjusting sleeve and the wire ring.
Figure 4:
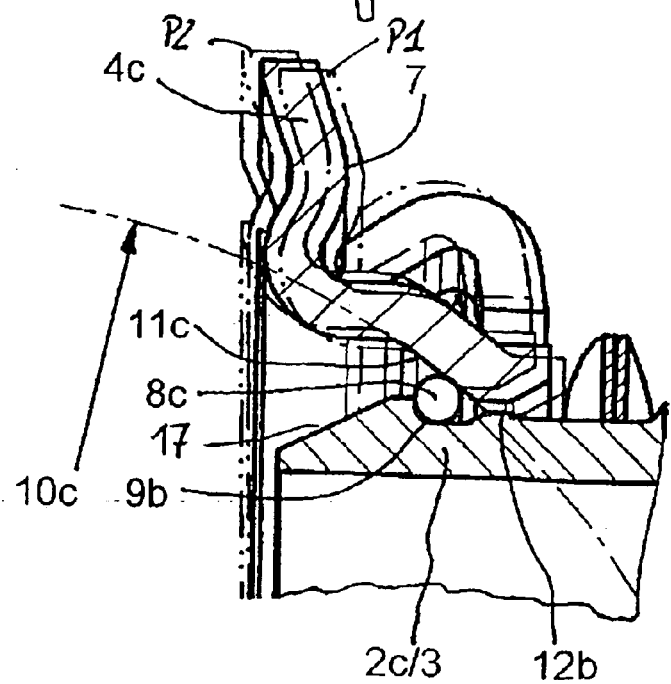
FIG. 4 is an enlarged view of Detail A of FIG. 3.

In FIGS. 3 and 4, a release ring 4c cooperates with an adjusting sleeve 2c by way of a wire load ring 8c. The wire load ring 8c is seated in a groove 9b in the adjusting sleeve 2c and cooperates with a concave spherical surface 11c on the release ring 4c, wherein the spherical surface 11c has a radius 10c. The adjusting sleeve 2c serves simultaneously as the inner ring 3 and has a bevel 17 on its distal surface. This simplifies the assembly of the adjusting sleeve 2c and the release ring 4c, since release ring 4c can be easily pushed on and snapped into place.

As previously described, the wire load ring 8c is open ended and can be inserted circuitously into the groove 9b. In one embodiment, the two ends of the wire ring 8c are secured by a closure 15. Depending on available space in the release device, the closure 15 may be a hook, kept together by centrifugal forces.

In the embodiments of FIGS. 3 and 4, the load ring 8c is located axially between the release spring 5 and the release bearing 1. Cut-outs 22, in the form of lugs or tongues, are part of release ring 4c and disposed circumferentially about the release ring. The lugs are bent first upwardly and thereafter radially inwardly to engage the ends of the release spring 5. A wire ring (not shown) receives the release spring to the lugs. FIG. 3 and 4 also show an annular member or spring 24 for exerting axial pressure as is known, for example, from U.S. Pat. No. 5,826,432.

Figure 5:
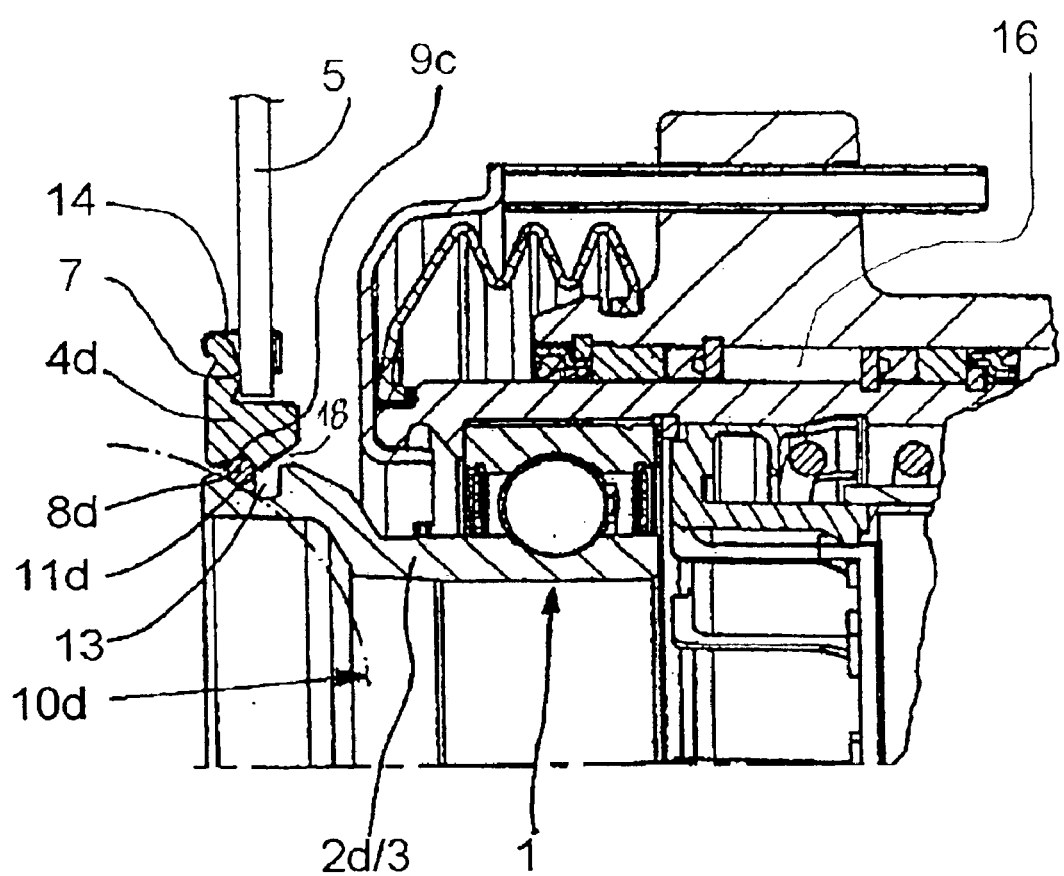
FIG. 5 is a partial cross-sectional view of a reversal of the arrangement of the cooperating parts, namely, the spherical surface and the wire ring, in a hydraulically actuated release mechanism.

FIG. 5, is a partial cross-sectional view of a clutch release mechanism actuated by a hydraulic adjusting device 16, where, as a reversal of the arrangement of the cooperating elements, a wire load ring 8d is connected to a release ring 4d, and a spherical surface 11d adjoins an adjusting sleeve 2d. For the wire load ring 8d, a groove 9c is provided on the inside diameter of the release ring 4d. The adjusting sleeve 2d, which simultaneously serves as the inner ring 3 of the release bearing 1, includes a ring-shaped groove 13, which holds the convex spherical surface 11d with a radius 10d. In addition, the release ring 4d also includes a guide bevel 18 to simplify the mounting of the wire load ring 8d. The wire load ring 8d is approximately at the same axial level as the diaphragm spring 5.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A release mechanism for actuating a friction clutch located between an internal combustion engine and a transmission of a motor vehicle, the release mechanism being installed concentric to a guide sleeve mounted on a transmission shaft having a center axis, the release mechanism comprising:
   a release spring;
   a clutch release bearing comprising an inner ring, an outer ring, and an adjusting sleeve, the inner ring being fixed to the adjusting sleeve, the adjusting sleeve having a circumferential groove;
   a release ring in contact with the release spring and comprising a concave spherical surface having a center on the axis of the transmission shaft; and
   a load ring seated in the circumferential groove and in contact with the concave spherical surface of the release ring, the load ring being a wire having a round cross-section, whereby the release ring can pivot about the center of the concave spherical surface to compensate for tilting of the center axis of the friction clutch with respect to the center axis of the transmission shaft and wobbling eccentricity of the release spring.

2. A release mechanism as in claim 1 wherein said adjusting sleeve has a circumferential recess which accommodates pivoting of the release ring about the center of the concave spherical surface.

3. A release mechanism as in claim 1 wherein the load ring is open-ended.

4. A release mechanism as in claim 2 wherein the load ring comprises a closure which secures the ends of the load ring.

5. A release mechanism as in claim 1 wherein the concave spherical surface is approximated by the segment of a cone.

6. A release mechanism as in claim 1 wherein the inner ring and the adjusting sleeve are formed as one piece.

7. A release mechanism for actuating a friction clutch located between an internal combustion engine and a transmission of a motor vehicle, the release mechanism being installed concentric to a guide sleeve mounted on a transmission shaft having a center axis, the release mechanism comprising:
   a release spring;
   a clutch release bearing comprising an inner ring, an outer ring, and an adjusting sleeve, the inner ring being fixed to the adjusting sleeve, the adjusting sleeve having a convex spherical surface with a center on the axis of the transmission shaft;
   a release ring in contact with the release spring and having an inward facing circumferential groove; and
   a load ring seated in the circumferential groove and in contact with the convex spherical surface of the adjusting sleeve, the load ring being a wire having a round cross-section, whereby the release ring can pivot about the center of the convex spherical surface to compensate for tilting of the center axis of the friction clutch with respect to the center axis of the transmission shaft and wobbling eccentricity of the release spring.

8. A release mechanism as in claim 7 wherein said adjusting sleeve has a circumferential recess which accommodates pivoting of the release ring about the center of the concave spherical surface.

9. A release mechanism as in claim 7 wherein the load ring is open-ended.

10. A release mechanism as in claim 7 wherein the load ring is substantially axially aligned with the release spring.

11. A release mechanism as in claim 7 wherein the convex spherical surface is approximated by the segment of a cone.

12. A release mechanism as in claim 7 wherein the inner ring and the adjusting sleeve are formed as one piece.

* * * * *